United States Patent [19]
Bailey et al.

[11] Patent Number: 4,795,212
[45] Date of Patent: Jan. 3, 1989

[54] CHAIR BACK ADJUSTMENT

[75] Inventors: Charles E. Bailey, Zeeland; George A. Miles, West Olive, both of Mich.

[73] Assignee: Herman Miller, Inc., Zeeland, Mich.

[21] Appl. No.: 149,858

[22] Filed: Jan. 29, 1988

[51] Int. Cl.$^4$ ................................................ A47C 9/00
[52] U.S. Cl. .................................... 297/362; 297/361; 297/383
[58] Field of Search .......................... 297/362, 361, 383

[56] References Cited

U.S. PATENT DOCUMENTS

| | | | |
|---|---|---|---|
| 2,272,980 | 2/1942 | McLellan et al. | 297/361 |
| 2,310,366 | 2/1943 | Harman . | |
| 3,814,475 | 6/1974 | Slabon et al. | 297/361 |
| 4,386,805 | 6/1983 | Boisset | 297/362 |
| 4,504,091 | 3/1985 | Ohshiro | 297/362 |
| 4,576,412 | 3/1986 | Terada | 297/362 |
| 4,580,838 | 4/1986 | Schottker et al. | 297/362 |
| 4,598,947 | 7/1986 | Fourrey et al. | 297/362 |
| 4,641,887 | 2/1987 | Klueting | 297/362 |
| 4,685,735 | 8/1987 | McFalls et al. | 297/361 |

FOREIGN PATENT DOCUMENTS

| | | | |
|---|---|---|---|
| 0195930 | 10/1986 | European Pat. Off. | 297/362 |
| 924365 | 2/1955 | Fed. Rep. of Germany | 297/362 |

*Primary Examiner*—James T. McCall
*Attorney, Agent, or Firm*—Varnum, Riddering, Schmidt & Howlett

[57] ABSTRACT

A seat back adjustment unit including a seat attaching plate which is fixedly secured to the seat of a chair and a back mounting plate which will have mounted thereon the customary seat back. The seat attaching plate has an upwardly and rearwardly curved portion on which there is mounted an adjustment unit. The adjustment unit in turn carries a lower generally horizontal portion of the back mounting plate. The adjustment unit includes a housing which is guidedly mounted on the curved rear portion of the seat attaching plate while the same housing has guidedly received therein the lower portion of the back mounting plate. The adjustment unit includes within the housing thereof a reduction gear drive unit which includes two driven member interlocked by pin and slot connections to the seat attaching plate and the back mounting plate for selective relative movement between the plates and the housing of the adjustment unit. A single actuator is selectively positionable to drive a selective half of the reduction gear drive unit to adjust either the tilt or the position of the seat back.

13 Claims, 4 Drawing Sheets

CHAIR BACK ADJUSTMENT

This invention relates in general to new and useful improvements in chairs, and more particularly to a chair back adjustment.

Still more particularly, this invention relates to a seat back adjustment unit which includes and is carried by a seat attaching plate and which includes and carries a back mounting plate, the two plates being joined together by an adjustment unit to permit one to change the tilt angle of the back or to shift the back towards and away from the seat. The unit may be so located that it may be manipulated by an occupant of the chair.

Various prior devices have been provided for changing the relationship of a seat back relative to the seat. Schottker et al U.S. Pat. No. 4,580,838 discloses a seat arrangement in which the height of the seat may be adjusted and the back of the seat may be tilted. The adjustment unit of this patent employs a pair of gear sets controlled by a rotatable knob which is axially movable to selectively engage one or the other of the gear sets to adjust either the height of the seat or the tilt of the back. The gear sets include eccentric gear arrangements.

Klueting U.S. Pat. No. 4,641,887 discloses a hinge connecting a seat and a seat back. A planetary gear set is provided for adjusting the angle of the hinge and thus the angle of tilt or inclination of the seat back.

Fourrey et al U.S. Pat. No. 4,598,947 provides for the change of tilt or inclination of a seat back utilizing a gear set including an oval drive gear.

Other patents relating to seat back tiling mechanisms include Terada U.S. Pat. No. 4,576,412, Ohshiro U.S. Pat. No. 4,504,091, Slabon et al U.S. Pat. No. 3,814,475 and McLellan et al U.S. Pat. No. 2,272,980. All of these patents provide adjustments for the tilting of a seat back relative to a seat. Further, Harman U.S. Pat. No. 2,310,366 relates to a chair in which the back rest is movable horizontally and vertically by means of a single control.

In accordance with this invention, the seat back adjustment unit includes a housing having a curved guideway in which a curved rear portion of a seat attaching plate is slidably mounted and a horizontal guideway in which a forward lower portion of a seat attaching plate is slidably mounted. Separately operable gear means connect the housing to the two plates with the housing tilting as it moves along the curved rear portion of the associated seat attaching plate to vary the tilt of the seat back while the horizontal lower portion of the back mounting plate is slidable linearly within the housing.

With the above in view and other objects that will hereinafter appear, the nature of the invention will be more clearly understood by reference to the following detailed description, the appended claims, and the several views illustrated in the accompanying drawings.

Figure 5:
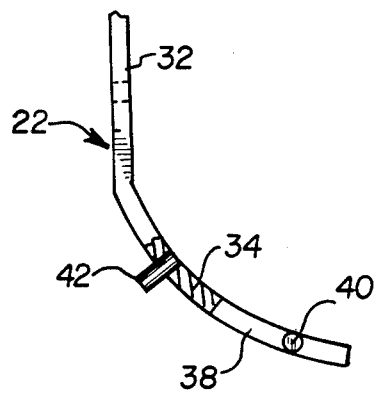

FIG. 5 a fragmentary side elevational view of the seat attaching plate.

Figure 6:
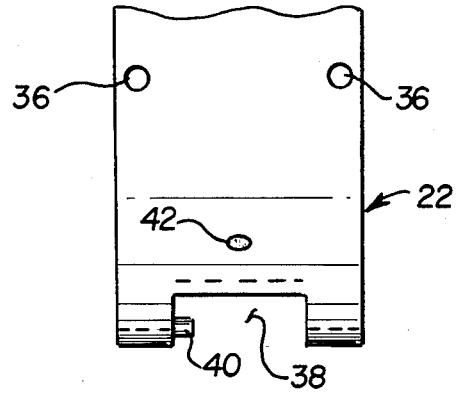

FIG. 6 is a top view of the seat attaching plate of FIG. 5.

Figure 7:
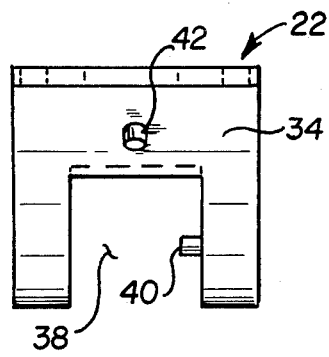

FIG. 7 is an end elevational view of the seat attaching plate.

Figure 8:
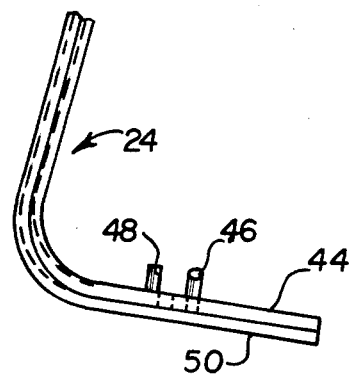

FIG. 8 is a fragmentary side elevational view of the back mounting plate.

Figure 9:
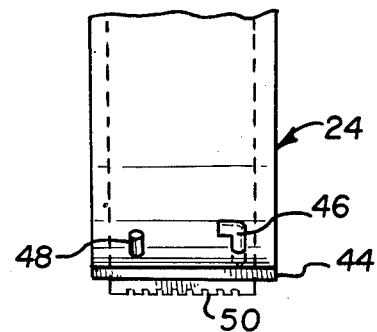

FIG. 9 is a fragmentary front elevational view of the back mounting plate.

Figure 10:
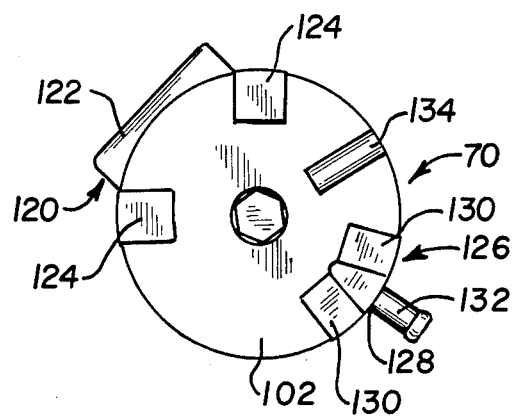

FIG. 10 is a side elevational view of the reduction gear unit.

Figure 1:
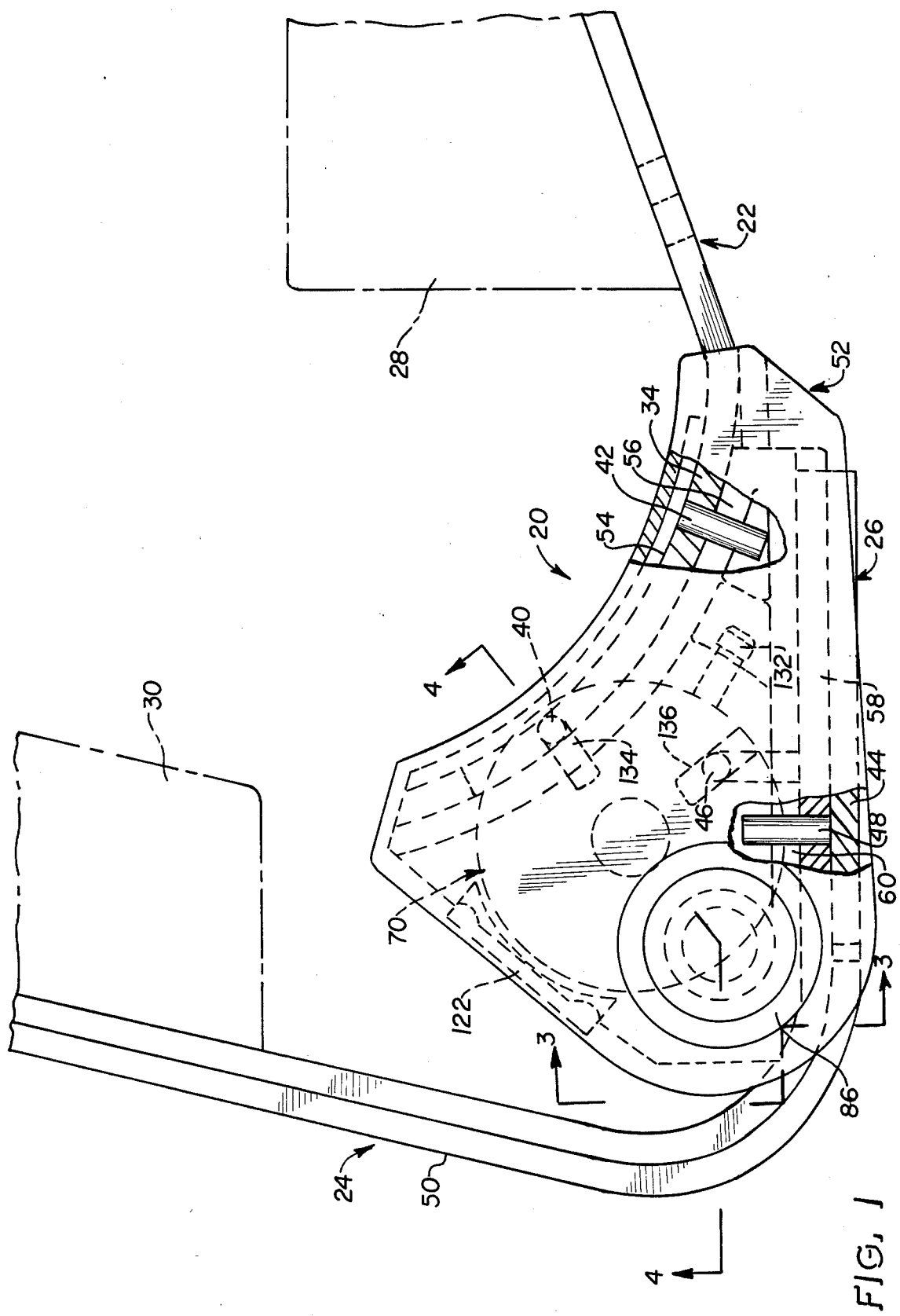
FIG. 1 is a side elevational view of a seat back adjustment unit formed in accordance with the invention, with parts broken away and shown in section.
Figure 2:
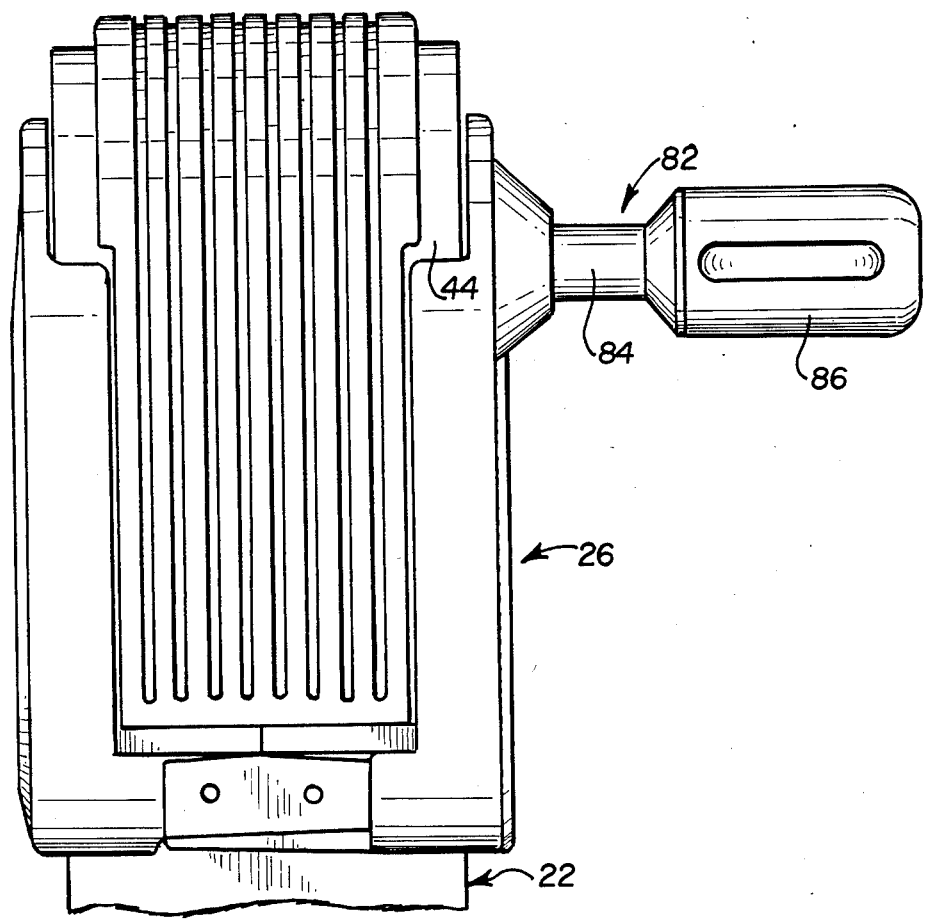
FIG. 2 is a bottom plan view of the seat back adjustment unit of FIG. 1 and shows further details thereof.

Referring now to the drawings in detail, there is illustrated in FIG. 1 a seat back adjustment unit formed in accordance with this invention and generally identified by the numeral 20. The seat back adjustment unit is formed of three basic components which include a seat attaching plate 22, a seat back mounting plate 24 and an adjustment unit generally identified by the numeral 26. It is to be understood that the seat attaching plate 22 will be suitably secured to a seat which has been illustrated in interrupted lines and is identified by the reference numeral 28. In a like manner, a seat back, which has been shown in interrupted lines and identified by the numeral 30, is suitably secured to the back mounting plate 24.

The adjustment unit 26 is particularly constructed so as to permit one to adjust the tilt of the seat back 30 relative to the seat 28 and also to adjust the seat back 30 towards and away from the seat 28 generally in the direction of the seat attaching plate 22.

Reference is next made to FIGS. 5, 6 and 7 wherein the general details of the seat attaching plate 22 are shown. It will be seen that the seat attaching plate 22 includes a planar forward portion 32 and a curved rear portion 34, the rear portion 34 curving upwardly and rearwardly. The forward portion 32 is provided with suitable bolt-receiving openings 36 for facilitating the attachment of the seat attaching plate 32 to a seat such as the seat 28.

It is to be noted that the upper end portion of the curved portion 34 is provided with a notch 38 in which will be received a portion of a reduction gear unit to be described hereinafter. Further, the plate 22 carries a transverse pin 40 which projects in the notch and which will be received in a slot in the reduction gear unit for the purpose of coupling the reduction gear unit to the plate 22.

Finally, it is to be noted that the plate 22 has projecting downwardly from the curved portion 34 a guide pin 42 whose function will be described in detail hereinafter.

Reference is next made to FIGS. 8 and 9 wherein there are illustrated the details of the back mounting plate 24. It is to be particularly noted that the back mounting plate 24 includes a straight lower portion 44 and that this straight lower portion 44 carries an L-shaped pin 46 which is offset to one side of the straight portion 44 and projects generally toward the opposite side for interlocking engagement with the reduction gear unit. Generally speaking, it may be said that the upper portion of the L-shaped pin 46, which is inverted, faces in an opposite direction from the pin 40 carried by the plate 22.

It is pointed out that the lower part 44 of the plate 24 also carries an upstanding guide pin 48. Further, it is to be noted that the underside of the plate portion 44 is provided with a bumper type backing 50 which is adhesively secured thereto. The backing 50 extends beyond the lower plate portion 44 and up the rear surface of the plate 24, as is best shown in FIG. 8.

Figure 3:
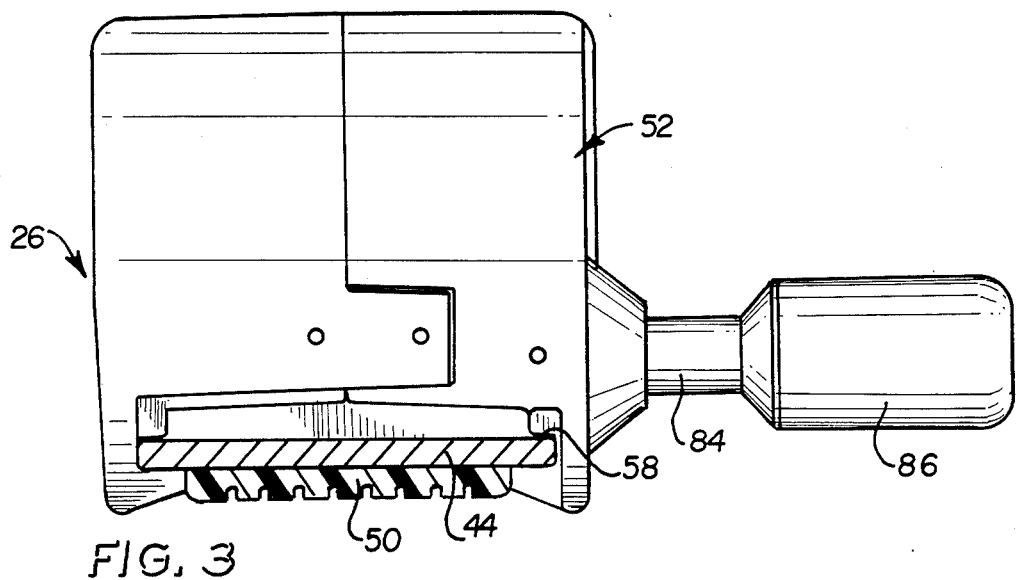
FIG. 3 is a vertical sectional view taken generally along the line 3—3 of FIG. 1 and shows portions of the adjustment unit in elevation from the left side of FIG. 1.

Referring now to FIGS. 1 and 3, it will be seen that the adjustment unit 26 includes a split housing generally identified by the numeral 52. The housing 52 is internally constructed so that the upper part thereof defines opposing guideways 54 which receive in guided sliding relation the curved portion 34 of the seat attaching plate 22. Further, it will be seen that the housing 52 provides a guideway 56 for the pin 42 so that twisting of the seat attaching plate 22 with the respect to the housing 52 is prevented.

In a like manner, the lower portion of the housing 52 defines a pair of oppositely opening guideways 58 which receive side edge portions of the lower portion 44 of the back mounting plate 24. Further, the lower part of the housing 52 defines a guideway 60 for the pin 48 so as to prevent twisting of the back mounting plate 24 relative to the housing 52.

Figure 4:
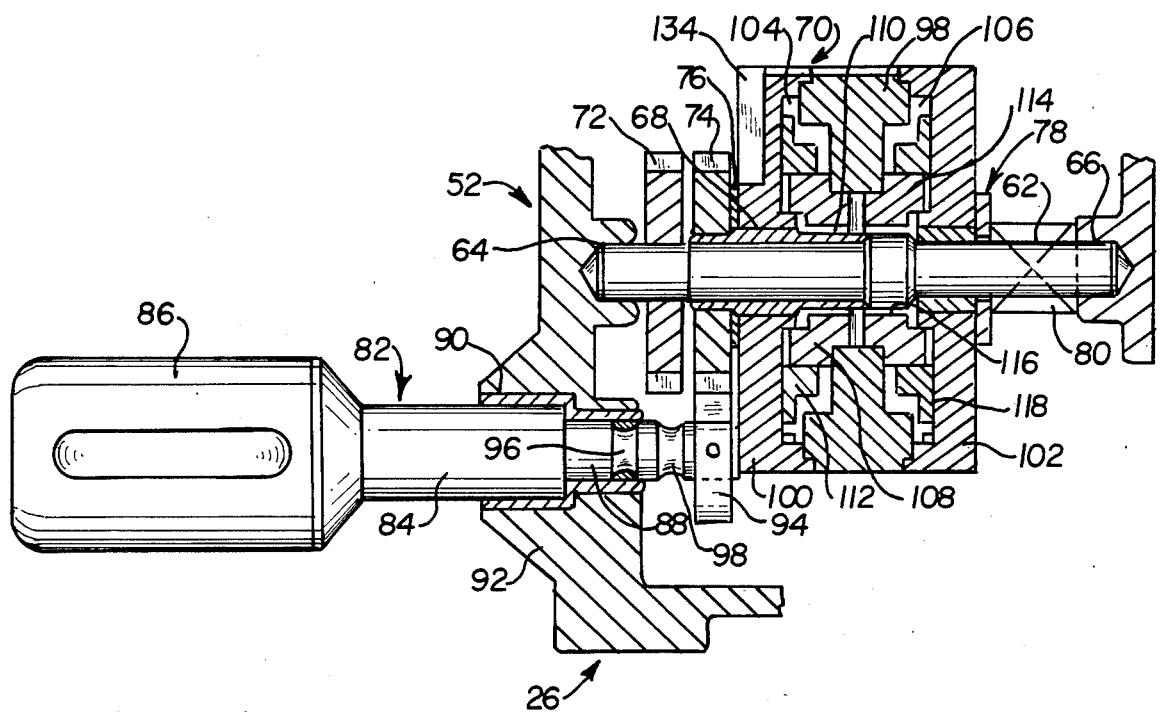
FIG. 4 is a transverse sectional view taken generally along the line 4—4 of FIG. 1 and shows specifically the details of the drive mechanism of the adjustment unit.

Referring now to FIG. 4, it will be seen that extending transversely across the housing 52 is a shaft 62 which has opposite ends journaled in bores 64, 66 formed in the inner walls of the housing 52. The shaft 62, in turn, has rotatably journaled thereon a shorter outer shaft 68. The shafts 62, 68, carry a reduction gear unit 70 to be described in detail hereinafter.

It is pointed out that the shaft 62 carries a driven gear 72 while the shaft 68 carries a driven gear 74. It is also to be noted at this time that the reduction gear unit 70 is floatingly carried on the shafts 62, 68 and a suitable thrust washer 76 is positioned between the gear 74 and the reduction gear drive unit 70. Further, the opposite side of the reduction gear drive unit 70 is engaged by a thrust washer 78 under the compressive loading of a coil spring 80.

In order that the shafts 62, 68 may be selectively driven, there is provided a manual actuator 82. The manual actuator 82 includes a primary shaft 84 having a suitable grip member or knob 86 fixedly secured to its outer end. The shaft 84 also includes a reduced diameter shaft portion 88. The shaft 84 and the reduced diameter shaft portion 88 are mounted for rotation and for axial movement in a bushing 90 carried by a projecting portion 92 of the housing 52. The reduced diameter shaft portion 88, in turn, carries a drive gear 94. In one position of the shaft 84, the drive gear 94 engages the gear 74 to rotate the shaft 68 while in a second position of the actuator, the gear 94 engages the gear 72 to rotate the shaft 62.

It is pointed out that the reduced diameter shaft portion 88 is provided with a pair of ball detent locking grooves 96, 98 for selectively receiving a ball detent (not shown) carried by the bushing 90 so as to maintain the actuator 82 in an in or out position.

Referring again to FIG. 4 in particular, it will be seen that the reduction gear drive unit 70 includes a central housing member 98 and outer housing members 100, 102. The outer housing member 100 is journaled on the shaft 68 for rotation while the outer housing member 102 is journaled on the shaft 62 for rotation. The outer housing members 100, 102 are in turn rotatably journaled relative to the center housing member 98. The center housing member 98 will be fixed against rotation in the manner to be described hereinafter with respect to FIG. 10.

It is pointed out that the outer housing members 100, 102 are in the form of ring gears and have internal gear portions 104, 106, respectively.

A first hub 108 is rotatably journaled within the central housing member 98 in eccentric relation to the axis of the shafts 62, 68 and is drivingly connected to the outer shaft 68 as at 110. The hub 108 carries a sun gear 112 which is meshed with the ring gear 104 to provide a greatly reduced drive between the shaft 68 and the outer housing member 100.

In a like manner, a hub 114 is rotatably journaled on the central housing member 98 for rotation in eccentric relation to the axis of the shaft 62. The hub 114 is drivingly connected to the shaft 62 as at 116 and carries a sun gear 118 which is meshed with the ring gear 106 in driving relation.

From the foregoing, it will be apparent that when the gear 74 is driven, the outer housing member 100 will be rotated at a very slow rate. In a like manner, when the gear 72 is rotated, the outer housing member 102 will be rotated at a very slow rate.

Referring now to FIG. 10, it will be seen that the reduction gear drive unit 70 is held together by a pair of spring clip members. These spring clip members include a spring clip member 120 having a base 122 and pairs of fingers 124 on opposite sides of the reduction gear drive unit 70, the fingers 124 engaging the outer housing members 100, 102 and holding them in contact with the central housing member 98 as shown in FIG. 4. The base 122 interlocks with the housing 52 as is shown in FIG. 1.

A second spring clip member 126 is disposed diagonally opposite the spring clip member 120 and includes a base 128 and pairs of fingers 130. The fingers 130 are disposed on opposite sides of the reduction gear drive unit 70 and engage the outer housing members 100, 102 to hold them further engaged with the central housing member 98. The base 128 carries a locking pin 132 which may extend through the base 128 into a bore within the central housing member 98 so as to prevent rotation of the central housing member 98. The pin 132, as is best shown in interrupted lines in FIG. 1, interlocks with the housing 52 so as to prevent rotation of the spring clip member 126.

It is also to be noted that the outer housing member 100 is provided in the outer face thereof with a radial notch or slot 134. The notch 134 receives the pin 40 carried by the seat attaching plate 22 so as to drivingly engage the outer housing member 100 with the seat attaching plate 22.

With reference to FIG. 1, it will be seen that a similar radial slot or notch 136 is formed in the outer housing member 102 and receives the transverse free end portion of the inverted L-shaped pin 46 carried by the seat back mounting plate 24. Thus the seat back mounting plate 24 is interlocked with the outer housing member 102 in driven relation.

OPERATION

Because the reduction gear drive unit 70 is of the irreversible type, the housing 52 remains locked relative to the seat attaching plate 22 while the back mounting plate 24 remains locked relative to the housing 52. When it is desired to change the tilt of the seat back 30 relative to the seat 28, the drive gear 94 is engaged with the driven gear 74 in the manner shown in FIG. 4 with the result that when the knob 86 is rotated, the outer housing member 100 will also be rotated so as to move the housing 72 along the curved portion 34 of the seat attaching plate 22. As the housing 52 moves along the curved portion 34, the back mounting plate 24 will change its angle with respect to the seat attaching plate 22.

On the other hand, when it is desired to move the back 30 towards or away from the seat 28, the actuator 82 is pulled outwardly from the housing 52 so that the drive gear or pinion 94 engages the driven gear 72 and thus rotates the shaft 62. Rotation of the shaft 62, in turn, results in the rotation of the outer housing member 102 with the resultant shifting of the back mounting plate 24 relative to the housing 52.

It will be apparent that the seat back adjustment unit may be so positioned on a chair that the knob 86 is comfortably accessible to an occupant of the chair while he remains seated therein.

Although only a preferred embodiment of the seat back adjustment unit has been specifically illustrated and described herein, it is to be understood that minor variations may be made in the seat back adjustment unit without departing from the spirit and scope of the invention as defined by the appended claims.

I claim:

1. A seat back adjustment unit comprising a seat attaching plate, a back mounting plate, and an adjustment unit, said adjustment unit including first adjusting means for moving said adjustment unit on and relative to said seat attaching plate to change the angular relation between said seat attaching plate and said back mounting plate to tilt a seat back relative to an associated seat, and second adjusting means for shifting said back mounting plate relative to said adjustment unit in a direction towards and away from said seat mounting plate to adjust the distance of a seat back from an associated seat.

2. A seat back adjustment unit according to claim 1 wherein said adjustment unit includes a housing having separate guideways for said seat attaching plate and said back mounting plate.

3. A seat back adjustment unit according to claim 2 wherein each of said adjusting means includes a separate drive unit.

4. A seat back adjustment unit according to claim 2 wherein each of said adjusting means includes a separate drive unit, and a common actuator for said drive units.

5. A seat back adjustment unit according to claim 2 wherein each of said adjusting means includes a separate drive unit, each of said drive units includes a rotatable drive member, and a drive connection between each of said drive members and a respective one of said seat attaching plate and said back mounting plate.

6. A seat back adjustment unit according to claim 5 wherein each of said drive members is in the form of a rotatable outer housing, and said drive connections are each in the form of a pin and slot arrangement.

7. A seat back adjustment unit according to claim 5 wherein said drive members are gear elements of reduction gear units arranged in side-by-side relation, and coaxial drive shafts connected to said gear elements.

8. A seat back adjustment unit according to claim 5 wherein said drive members are gear elements of reduction gear units arranged in side-by-side relation, and coaxial drive shafts connected to said gear elements, and a common actuator selectively coupleable to said drive shafts.

9. A seat back adjustment unit according to claim 1 wherein each of said adjusting means includes a separate drive unit, said drive unit being of a reduction gearing non-reverse drive type.

10. A seat back adjustment unit according to claim 1 wherein said seat attaching plate has a curved rear portion, and said adjustment unit includes a housing slidably guided on said curved rear portion.

11. A seat back adjustment unit according to claim 10 wherein said adjusting means include a nonreversible gear drive unit carried by said housing.

12. A seat back adjustment unit according to claim 10 wherein said adjusting means include a nonreversible gear drive unit carried by said housing, said gear unit including a rotating member, and there being a pin and slot connection between said rotating member and said seat attaching plate.

13. A seat back adjustment unit according to claim 1 wherein a seat is attached to said seat attaching plate and a seat back is attached to said back mounting plate.

* * * * *